(12) United States Patent
Dehn et al.

(10) Patent No.: US 9,766,909 B2
(45) Date of Patent: Sep. 19, 2017

(54) SEQUENCING OF BUSINESS OBJECT LOGIC EXTENSIONS TO ENSURE DATA CONSISTENCY ACROSS LAYERS

(71) Applicants: Rene Dehn, Sinsheim (DE); Daniel Figus, Wallduem (DE); Daniel Niehoff, Sandhausen (DE); Uwe Schlarb, Oestringen (DE); Bernhard Thimmel, Edingen-Neckarhausen (DE); Daniel Wachs, Frankenthal (DE); Georg Wilhelm, Nussloch (DE)

(72) Inventors: Rene Dehn, Sinsheim (DE); Daniel Figus, Wallduem (DE); Daniel Niehoff, Sandhausen (DE); Uwe Schlarb, Oestringen (DE); Bernhard Thimmel, Edingen-Neckarhausen (DE); Daniel Wachs, Frankenthal (DE); Georg Wilhelm, Nussloch (DE)

(73) Assignee: SAP SE, Walldorf (DE)

( * ) Notice: Subject to any disclaimer, the term of this patent is extended or adjusted under 35 U.S.C. 154(b) by 354 days.

(21) Appl. No.: 13/711,474

(22) Filed: Dec. 11, 2012

(65) Prior Publication Data

US 2014/0164067 A1    Jun. 12, 2014

(51) Int. Cl.
*G06Q 10/06*    (2012.01)
*G06Q 10/08*    (2012.01)
*G06Q 10/10*    (2012.01)
*G06F 9/445*    (2006.01)

(52) U.S. Cl.
CPC ......... *G06F 9/44526* (2013.01); *G06Q 10/06* (2013.01); *G06Q 10/08* (2013.01)

(58) Field of Classification Search
CPC ......... G06Q 10/06; G06Q 10/10; G06Q 10/08
USPC ......................................... 705/7, 8, 11, 7.36
See application file for complete search history.

(56) References Cited

U.S. PATENT DOCUMENTS

| 8,924,269 B2* | 12/2014 | Seubert ................. G06Q 10/06 705/35 |
| 2004/0181775 A1* | 9/2004 | Anonsen ................ G06Q 10/10 717/104 |
| 2005/0114201 A1* | 5/2005 | Walsh et al. .................... 705/10 |
| 2005/0235274 A1* | 10/2005 | Mamou ................. G06Q 10/10 717/136 |
| 2006/0106859 A1* | 5/2006 | Eugene et al. ................ 707/102 |
| 2006/0184410 A1* | 8/2006 | Ramamurthy et al. ........... 705/8 |
| 2007/0250840 A1* | 10/2007 | Coker ....................... G06F 9/54 719/320 |
| 2009/0007056 A1* | 1/2009 | Prigge .................... G06Q 10/10 717/104 |
| 2009/0089254 A1* | 4/2009 | Von Kaenel et al. ............ 707/3 |
| 2010/0057776 A1* | 3/2010 | Baeuerle ................ G06Q 30/06 707/E17.001 |

(Continued)

*Primary Examiner* — Nga B Nguyen
(74) *Attorney, Agent, or Firm* — Mintz Levin Cohn Ferris Glovsky and Popeo, P.C.

(57) ABSTRACT

In one aspect, there is provided a method. The method may include performing, by a sequencer, one or more validations of a plurality of extensions to a core service of a business system; controlling, by the sequencer, execution of a sequence including the plurality of extensions and the core service to enable an action to be performed at the business system; and performing, by the sequencer, one or more post-processing checks of the plurality of extensions. Related systems, methods, and articles of manufacture are also disclosed.

12 Claims, 13 Drawing Sheets

(56) References Cited

U.S. PATENT DOCUMENTS

2010/0114941 A1\* 5/2010 Von Kaenel et al. ......... 707/769
2011/0208788 A1\* 8/2011 Heller ....................... G06F 8/30
   707/810
2013/0085799 A1\* 4/2013 Zhang .............. G06Q 10/06316
   705/7.26

\* cited by examiner

SEQUENCING OF BUSINESS OBJECT LOGIC EXTENSIONS TO ENSURE DATA CONSISTENCY ACROSS LAYERS

TECHNICAL FIELD

The subject matter described herein relates generally to data processing.

BACKGROUND

The inherent complexity of business scenarios, which can include one or more business processes, and their implementation in business software solutions, enterprise resource planning (ERP) systems, and the like can present substantial challenges to users and can be a serious obstacle to widespread operative use of process and scenario models in the software landscape. Indeed, these complex business processes may include dozens, if not hundreds or more, steps, making it difficult for the end-user and the enterprise to manage. Moreover, these processes can include components generated by a variety of entities, making the management of the enterprise even more challenging.

SUMMARY

In one aspect, there is provided a method. The method may include performing, by a sequencer, one or more validations of a plurality of extensions to a core service of a business system; controlling, by the sequencer, execution of a sequence including the plurality of extensions and the core service to enable an action to be performed at the business system; and performing, by the sequencer, one or more post-processing checks of the plurality of extensions.

In some variations, one or more of the following features can optionally be included in any feasible combination. The plurality of extensions may include a first extension specific to a region, a second extension specific to an industry, a third extension developed by an entity other than a developer of a core service of the business system, and a fourth extension specific to an end-user of the business system. The sequencer may access metadata representative of dependencies among the plurality of extensions and the core service to enable the performing of the one or more validations. The one or more validations may include controlling, based on metadata, a declaration from at least one of the plurality of extensions to another one of the plurality of extensions. The one or more validations may include controlling, based on metadata, a dependency between at least one of the plurality of extensions and another one of the plurality of extensions. The one or more validations may include controlling the sequence of a runtime execution of the plurality of extensions. At least one of the plurality of extensions may include logic to provide at least one of a determination, an action, or a validation. The one or more post-processing checks may include a consistency check of data associated with at least one of the plurality of extensions. The sequencer may be comprised at a processor of a multi-tenant system. The sequencer may access metadata defining at least dependencies among the first extension, the second extension, the third extension, and the fourth extension to enable execution of one or more of the performing the one or more validations, the controlling, and the performing the one or more post-processing checks. At least one of the plurality of extensions may be provided by an entity other than the developer of the core service of the business system.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
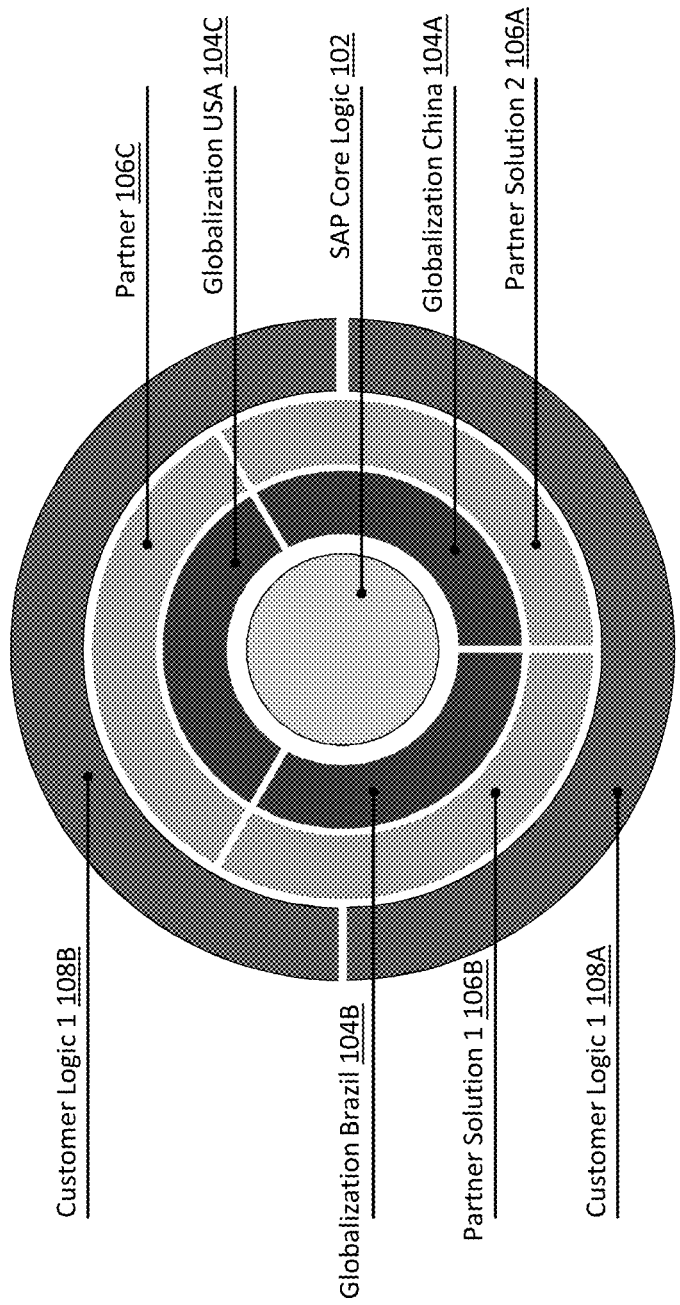
FIG. 1 depicts extensions (also referred to as layers) associated with a business system.

FIG. 1 provides a graphical depiction of extensions (also referred to as layers) associated with a business system. A business system, such as an enterprise resource planning system, customer relationship management system, and the like, may include core logic 102 and additional logic that may be added via extensions, such as extensions 104A-C, 106A-C, and 108A-B. These extensions may provide, in some example implementations, a decoupling between core logic 102 and extensions 104A-C, 106A-C, and 108A-B.

For example, a business system may include core logic 102 to provide a core business service, such as customer relationship management, enterprise resource planning, and purchasing, and the like. And, extensions 104-108 may add, for example, extensions specific to various country around the world, such as globalization extensions 104A-C, localization logic, industry specific logic, logic specific to a development partner 106A-C, logic specific to an end-user customer 108A-B, and the like. Furthermore, core logic 102 may be developed and/or provided by a primary developer, while some of the extensions may be added by a first entity and some of the other extension may be developed by other entities, such as another developer/company (e.g., a partner), an end-user customer, and the like. Moreover, these extensions may have dependencies. For example, an extension associated with customer logic may use the results of partner specific logic, which may also use the results provided by a localization logic extension/layer. Although these extensions may be developed by different entities, the subject matter disclosed herein may provide a sequencer for ensuring the sequencing and consistency of the extensions/layers. For example, data at a so-called lower layer should be able to apply consistency checks and derivation logic, when a higher layer modifies data belonging to the lower/inner layer.

Figure 2:
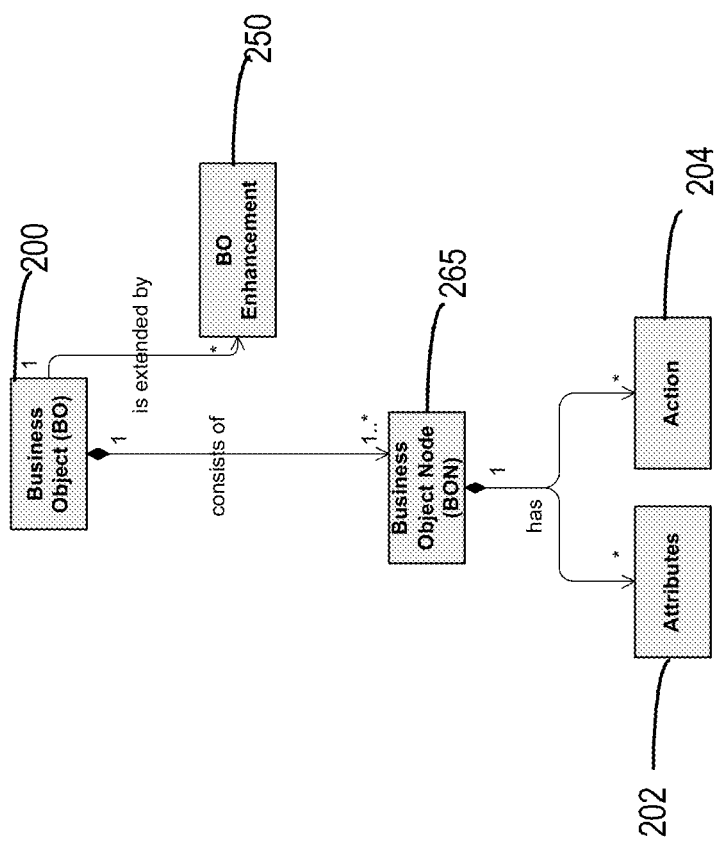
FIG. 2 depicts an example of a business object.

FIG. 2 depicts an example a business object (BO) 200 comprising data content (e.g., attributes) 202 and processes (e.g., actions) 204. The business object 200 may be used to structure an object in terms of a real world business task. For example, a business object may comprise an object including data and processes for a sales order, and another business object may include data and processes for a purchase order, and so forth. The metadata of business object 200 may include one or more of fields, nodes, queries, actions, and business logic, and the metadata may be stored in a repository, such as a metadata repository (MDRS).

In some example implementations, one or more business objects may be predefined and provided as part of the system deployed to an end-user customer, although business objects may be defined, deployed, and provided in other ways as well. For example, in some example implementations, a core business object 200 may be extended by adding a business object extension 250 to satisfy a specific need, such as a globalization need, a partner need, an end-user customer need, and the like. The extension may add data, a process (e.g., an action), and the like.

Figure 3:
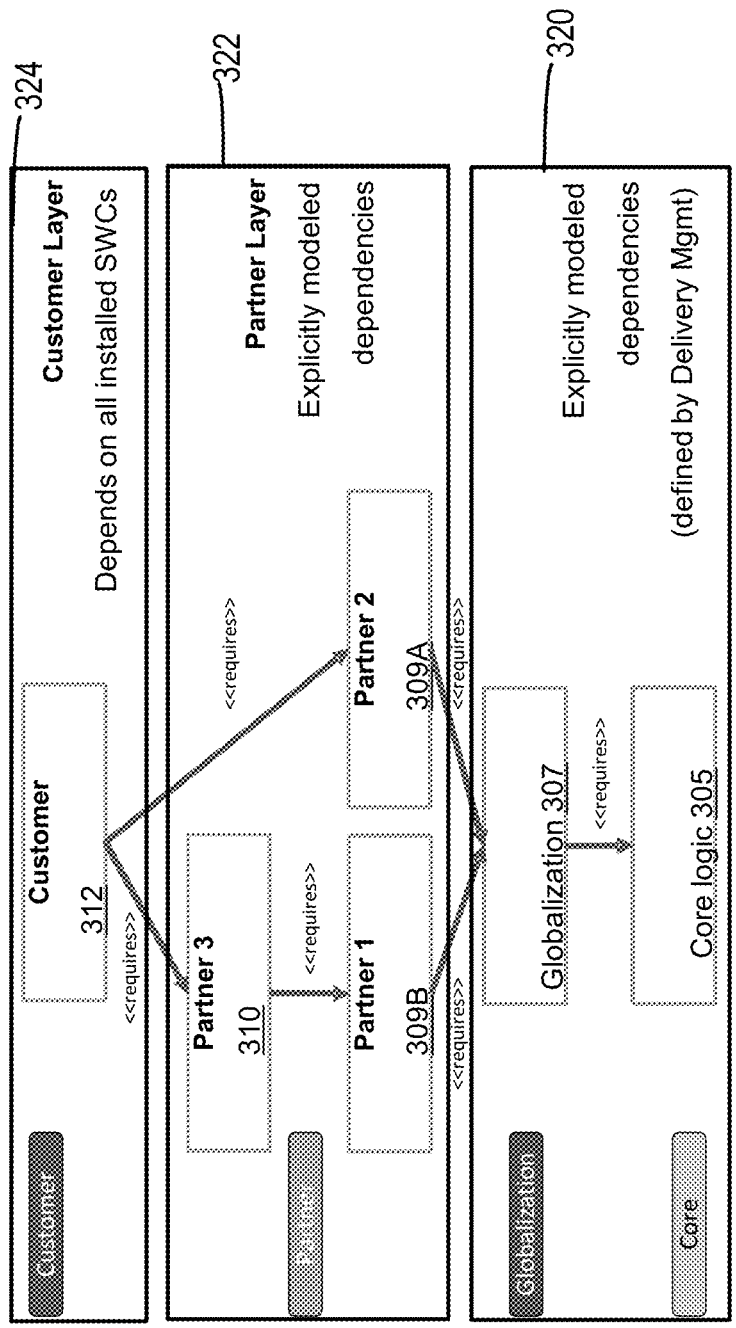
FIG. 3 depicts another example of extensions associated with a business system.

FIG. 3 depicts core logic 305, a globalization extension 307, partner extensions 309A-B and 310, and a customer extension 312. In the example of FIG. 3, there are generally three layers, namely a core layer 320, a partner layer 322, and a customer layer 324, although other layers may be implemented as well. The sequencer may access metadata defining the dependencies between the core business object (e.g., core business object) 305 and the extensions 309A-B, 310, and 312. In the example of FIG. 3, the dependency may take the form of customer extension 312 requiring data from partner extension 310 and partner extension 309A, partner extension 310 requiring data from partner extension 309B, partner extension 309B requiring data from globalization extension 307, partner extension 309A requiring data from globalization extension 307, which requires data from core logic/business object 305.

In the example of FIG. 3, the sequencer may, based on metadata, be configured to not allow the partner extension 310 to directly declare a dependency to globalization extension 307 because globalization extension 307 may not be considered a stable entity (e.g., a higher-layer extension is typically not allowed to refer to the technical name of globalization extension 307 but instead the higher-layer extension may refer to a software component). The extensions represent technical objects, which might not be stable. The software components (also referred to as "solutions") represent an application or a plug-in, which acts as a container for all technical objects and is typically more stable. If partner extension 310 only declares dependency to the partner extension 309B (which represents a software component comprising one or more extensions), the technical names of the extensions may become irrelevant. As the technical names may be generated by a generation framework (not provided by an end-user or developer) and may not be stable throughout the complete software lifecycle, the abstraction of the actual technical names of the extensions may be used in some implementations. However, the semantic compatibility may still be ensured by partner extension 309B if changes to the technical names occur (otherwise partner extension 310 may need to declare its dependency to a specific version of the software component). In some example implementations, the sequencer may include metadata defining that customer specific extensions should always be dependent on the installed software components.

In some example implementations, an extension, such as extension 307, 309A, and the like, may include other components, which can carry extension logic (e.g., determinations, actions, and/or validations) and may declare dependencies. For example, a calculation may comprise a+b+c=d. This may be performed by a first extension (e.g., a first determination of a+b=x) and a second extension (e.g., a second determination x+c=d). In this example, the second determination depends on the outcome of the first determination. As such, the sequencer disclosed herein may access metadata describing this dependency in order to ensure the sequence of execution as the first extension followed by the second extension.

The sequencer disclosed herein may access metadata describing the dependencies between the core logic/business object 102 and extension 102-108, as depicted in FIG. 1. Moreover, this dependency data may describe a static view. However, the sequencer may also be configured to ensure a proper execution sequence between the core logic/business object 102 and extension 102-108 during runtime.

Figure 4:
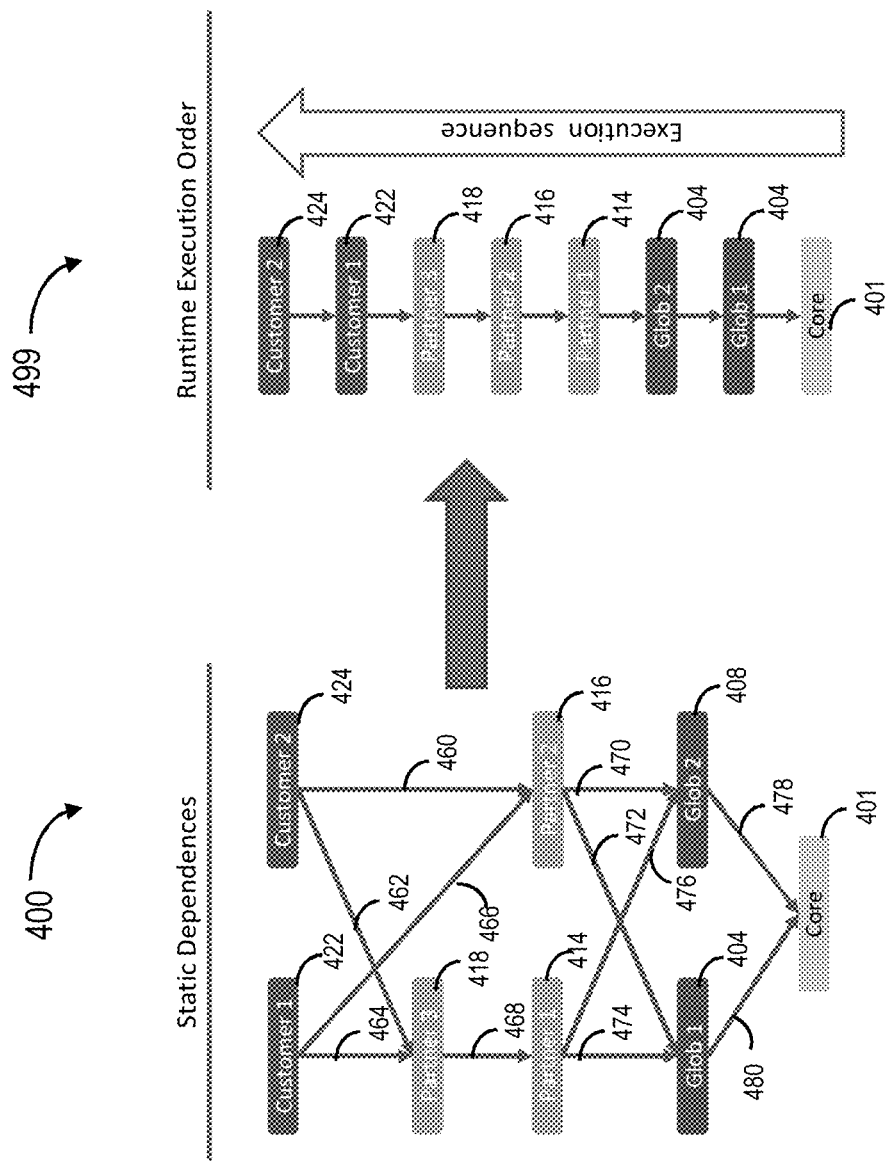
FIG. 4 depicts examples of static dependencies and a runtime order of extensions.

FIG. 4 depicts static dependencies 400 monitored and enforced by the sequencer and the runtime dependencies 499 monitored and enforced by the sequencer. In the example of FIG. 4, the sequencer may access metadata describing the following: a customer software layer including two components, such as customer 422 and 424; a partner layer 412 including three components, partner 414-418; a global layer 402 including two components, global 404 and 408 (labeled "Glob 1" and "Glob 2"); and a core logic component, such as a business object. The sequencer may also describe metadata defining a single, valid linear runtime execution order as shown at 499. A layer groups or categorizes one or more software components, and inside of every software component, there may be one or more extensions, which consist of one or more determinations, checks, post action enhancements and action validations In some example implementations, a component, such as core logic 401 and/or software components 408-424, may include an extension with a determination, as noted above. The determination may be configured to perform a change, such as an event-triggered change (e.g., changes, such as create, read, update, delete, and the like) to a business object. The determination may be used in the standard core logic 401 as well as in business object logic extensions 408-424. Depending on the extension and in which extension the determination is located, the determination may need to be called in a certain sequence under the control of the sequencer to ensure data consistency. For example, a determination in the globalization extension global software component 408 may need to be executed before a partner determination at partner software component 416.

The following provides another illustrative example. A legal requirement in a jurisdiction may require that a business object for a purchase order in the country USA include a calculation. Specifically, the jurisdiction may require that the business object supplier invoice calculate the sum of all item amount values and show the result. This requirement may be performed by a globalization extension with a determination (e.g., a business logic extension including the determination) that reads the values from the item business object node(s) after an event, such a value being added or changed. The sum may then be written into an extension field on a business object root node. In this example, a partner developer may now have the task from a specific US customer to add further business logic to set an extension field checkbox on the supplier invoice in case the calculated total amount field on root node exceeds the value "$1.000 USD," as a supervisor may need to approve the supplier invoice. The core business object logic 401 may also be extended by two different layers: a globalization extension 408 (e.g., extension field total amount plus a determination to calculate extension field) and a partner field 416 (e.g., extension field checkbox and a determination to set the checkbox if extension field total amount exceeds value "$1.000 USD"). The sequencer disclosed herein may be configured to control the execution sequence of the extensions, check consistency, and the like.

Figure 5:
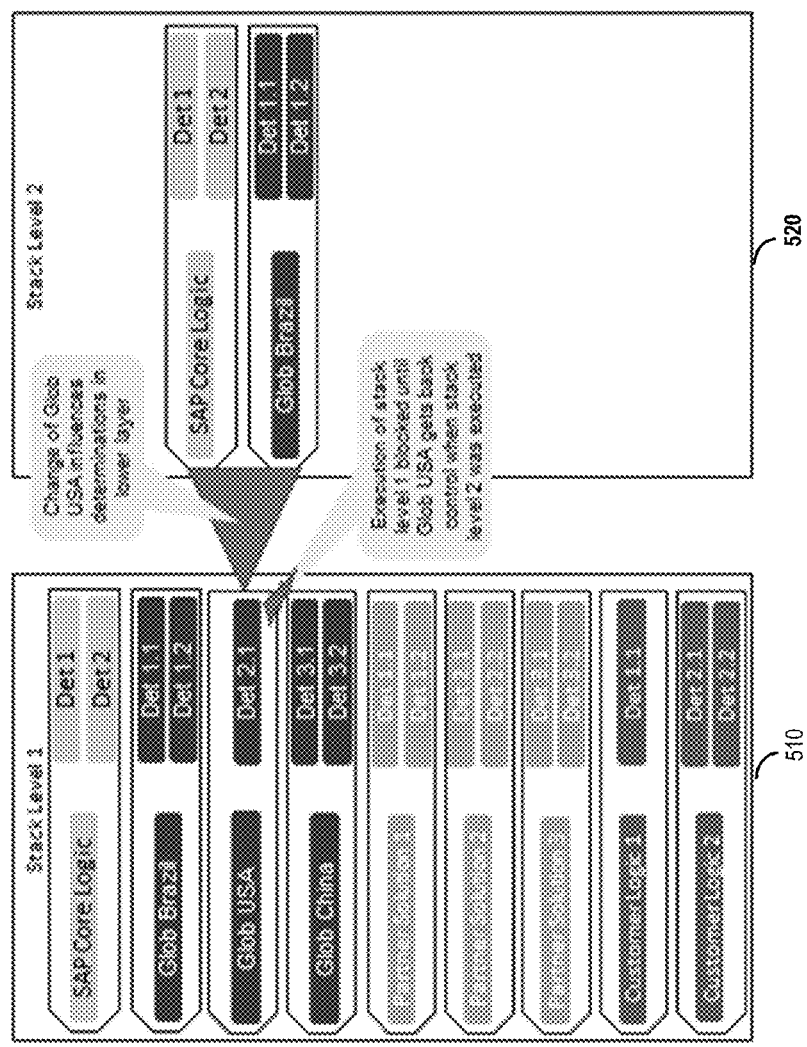
FIG. 5 depicts an example of a business object extension being re-executed.

FIG. 5 depicts an example of a two stacks, each including business object extensions. To avoid endless loops, the sequencer may control execution of the business object extensions so that a business object is not called again for its own changes. As such, change determination may prevent a current sequence flow on stack level 1 510 to continue execution, until the dependent determinations on stack level 2 520 are re-executed and thus completed. Although the previous example shows a two-stack example, other stack levels may be involved as well. Nested calls may ensure data consistency as all dependent changes may be executed again, when the business object extension (which triggered the change) regains control.

Referring again to FIG. 4, a component, such as core logic 401 and/or extensions 408-424, may, as noted, include an action. The action may comprise logic executed when a certain business object action is triggered, such as on a user interface or in a determination. The action may also be extended with, for example, an action enhancement to provide additional logic performed after the standard action logic is executed. Depending on the extensions and where they were created, action enhancements may be called in a certain sequence to ensure data consistency (e.g., globalization post actions may always be executed before partner post actions).

Figure 6:
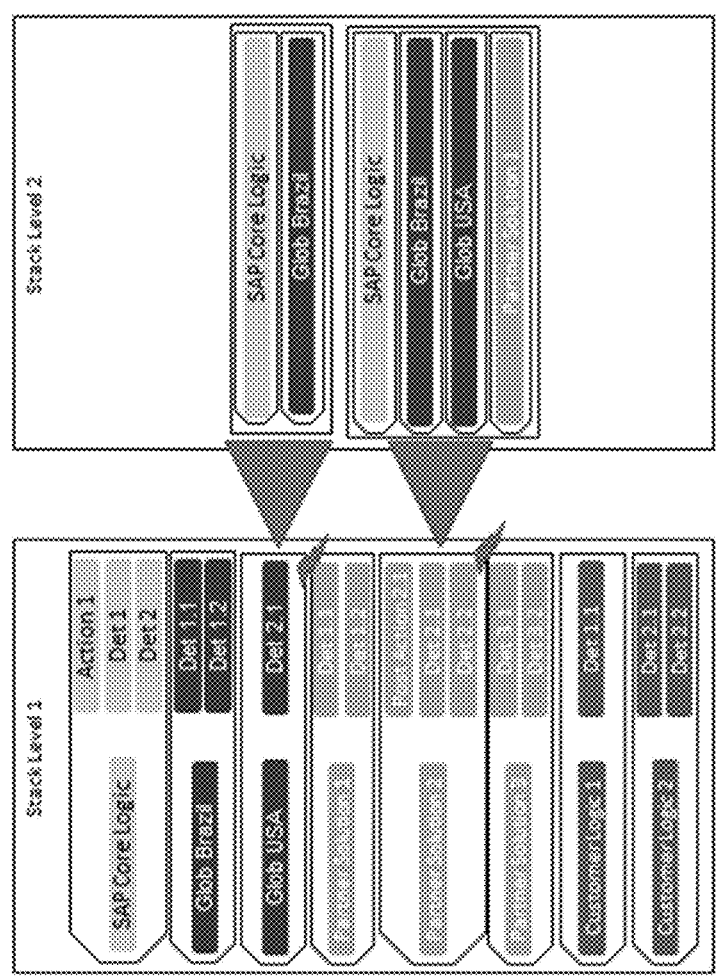
FIG. 6 depicts an example of when an action by an extension modifies a node.

FIG. 6 depicts an example of an action of a higher layer extension modifying a node. To avoid endless loops, the sequencer may require that the business object extension (which contains the action enhancement triggering a change) not be called again for its own changes. In the example of FIG. 6, "SAP core logic" and "Glob Brazil" are re-executed due to being called by "Partner Solution 2," which also changes data relevant to "SAP core logic," "Glob Brazil," and "Glob USA.

Figure 7:
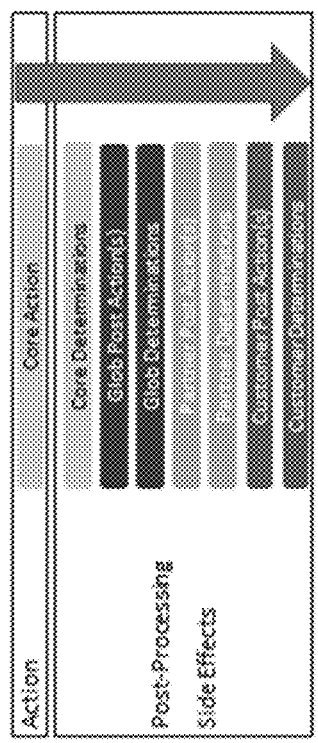
FIG. 7 depicts the interactions between actions and determinations.

FIG. 7 depicts the interactions between actions and determinations. FIG. 7 shows that the actions and determinations are executed together for the software component. This is valid for the core logic (e.g., core action and core determinations) and for the extensions. Accordingly, a partner post action can rely on data which was calculated from the post action and determination from a globalization extension.

The sequencer may also provide consistency checker, which may include logic for checking the current data of the business object for consistency and plausibility. A consistency check may raise messages having different severities (e.g., information, warnings, errors, and the like) and showing the result of the check to a user. The consistency checks may be configured in a read only mode (e.g., only read data of the business object but never change any data). Extensions may contain multiple consistency checks, but as consistency checks typically do not have any side effects, the sequence of consistency checks is typically not relevant. Therefore, no dependencies may be modeled between consistency checks inside an extension. The execution order may be derived solely from the dependencies of the business system components (e.g., software components). As the consistency checks validate the business object data, the data changes performed by determination components should be performed before the consistency checks.

Figure 8:
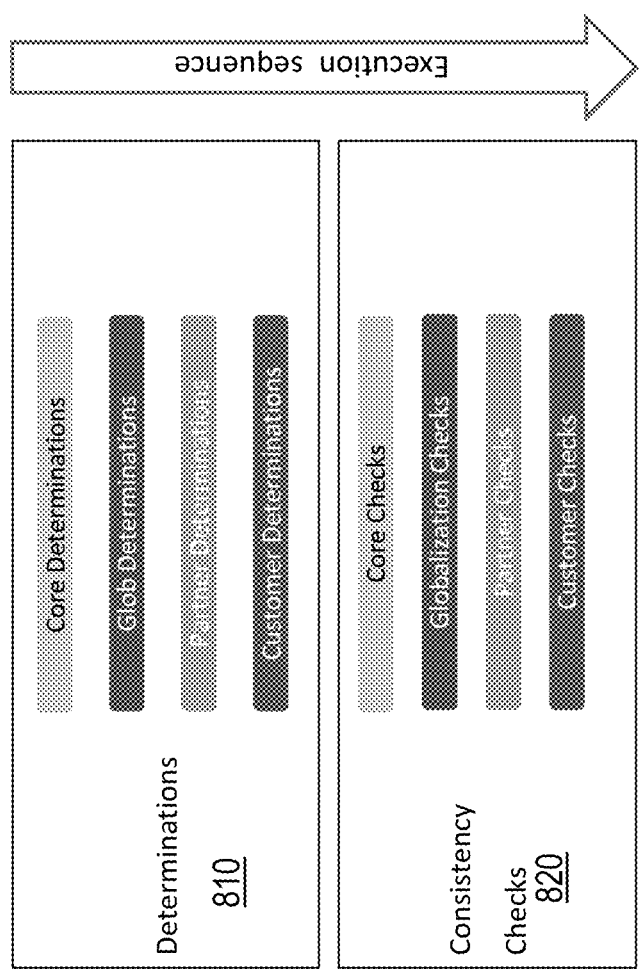
FIG. 8 depicts a linear execution order of the consistency checks and the determinations.

FIG. 8 depicts an example of the determinations being executed before the consistency checks 820. In some countries, an invoice may be required to contain a special electronic invoice number (e.g., issued by the government, such as Brazil Nota Fiscal). As this logic is specialized, the logic may not be part of the core business object logic. Instead, the logic may be part of a globalization extension for Brazil, and the Brazil consistency check may then validate that the electronic invoice number is correctly filled. In case this number is missing, an error message may be created for the end user. Furthermore, saving of this invoice may be rejected by the globalization consistency check at 820.

The sequencer may also include an action validations checker to confirm whether the required prerequisites are fulfilled prior to execution of an action (e.g., release of a sales order for delivery process). Action validations may also read data, check if the current business object state allows the action, and raise messages to the end user. If an action validation does not allow (e.g., rejections) the action execution, the business object framework may not proceed with the execution of the action.

Figure 9:
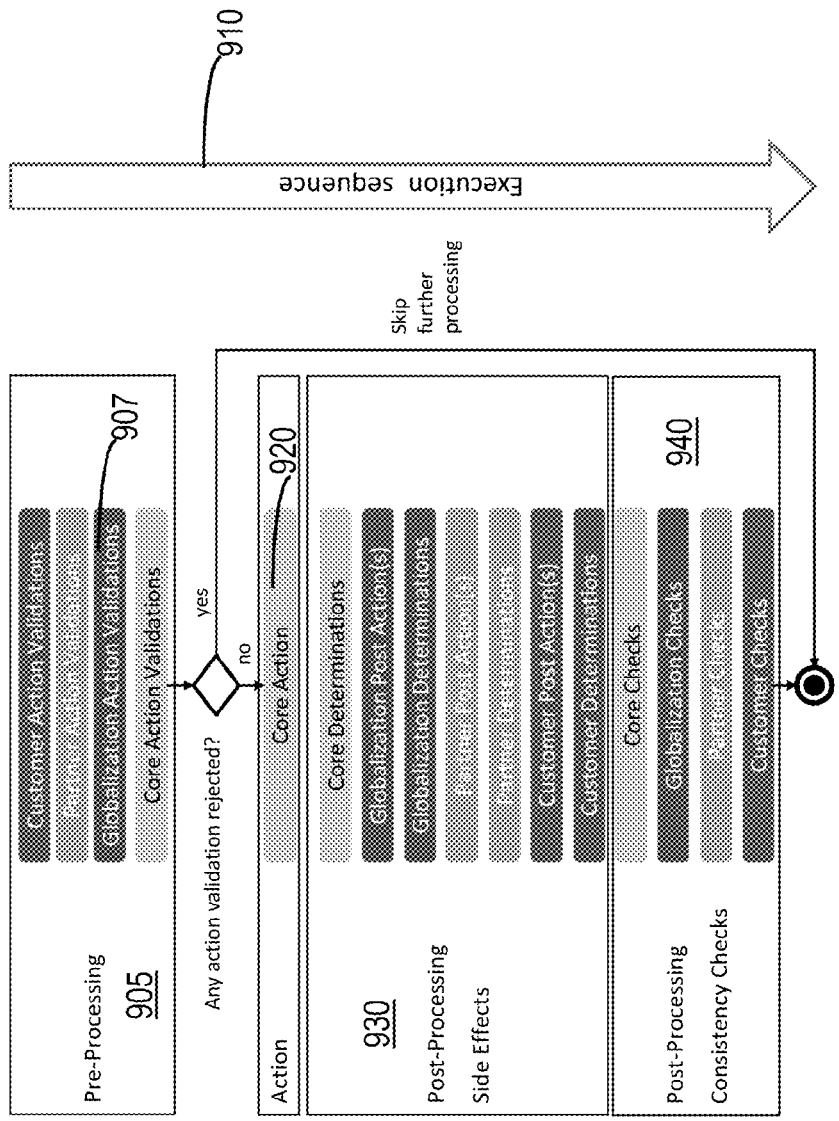
FIG. 9 depicts a linear execution order of the action validation and the other entities.

FIG. 9 depicts an example of a linear execution order 910 controlled by the sequencer disclosed herein. For example, the action sequence may relate to processing an invoice (which requires an electronic invoice number) posted to accounting via a core action 920, such as action post. The sequencer may include one or more pre-processing checks 905 to ensure that the core action 920 post proceeds when, for example, the electronic invoice number is correctly filled and/or checked via a web service. The pre-processing validation logic 905 may be implemented as an action validation is shipped via a country Globalization software component 907. If the electronic invoice number is not valid, the action post 920 is rejected and a message is created describing the error message for the end user. Furthermore, the action 920 and all of the post-processing 930 may be skipped. If an action is called inside of an extension (e.g., called from a Globalization determination), all action validations may be executed to ensure that all prerequisites are fulfilled.

Figure 10:
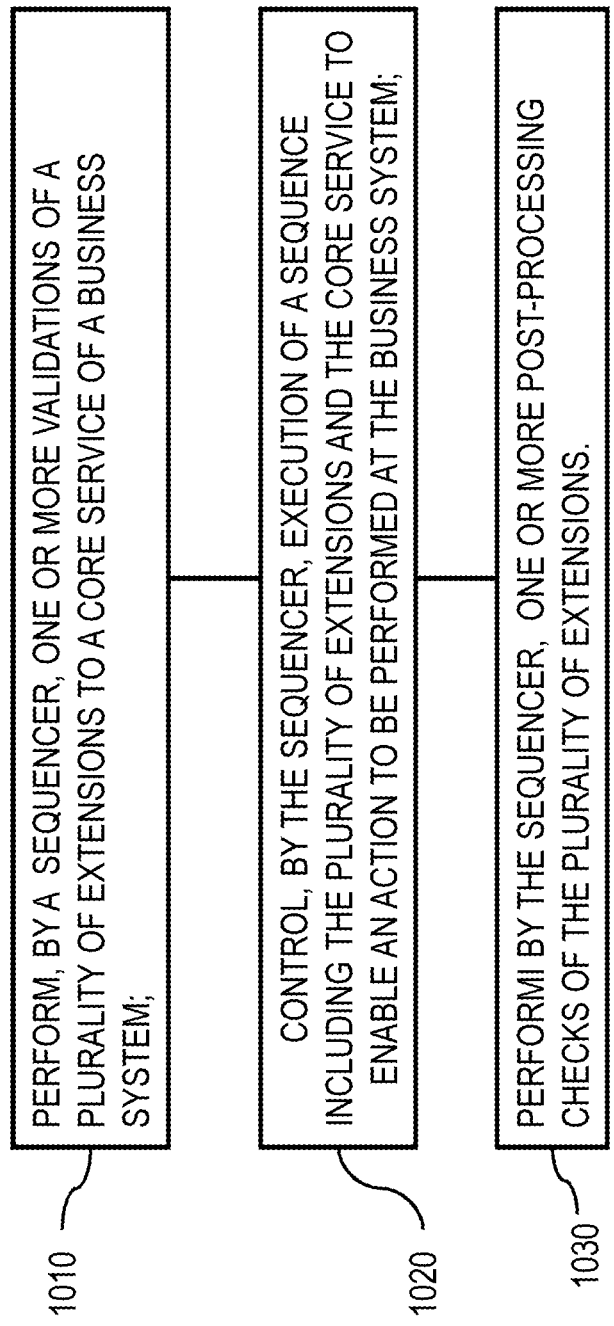
FIG. 10 shows a process flow for sequencing business object extensions.

FIG. 10 shows a process flow chart 1000 for sequencing business object extensions.

At 1010, one or more validations may be performed to a plurality of extensions to a core service of a business object. For example, the sequencer may perform one or more validations. The validations may include checking the dependencies among the plurality of extensions, controlling declaration between extensions, controlling the sequence of execution of the plurality of extensions, and the like. Moreover, the validations may be performed based on metadata obtained by the sequencer. Moreover, the validations may be performed in a particular order as well. In the example of FIG. 9, the sequencer may control the execution of the validations at 907, so that the validations are performed in a particular sequence (e.g., customer action validation, partner action validation, globalization action validation, and core action validation).

At 1020, the sequencer may also control execution of a sequence including the plurality of extensions and the core service to enable an action to be performed at the business system. For example, execution of the plurality of extension and core service in a given sequence may result in a core action being performed, such as a query, a creation, an update, and deletion, and the like to for example a database of the business system.

At 1030, the sequencer may also perform one or more post-processing checks of the plurality of extensions. For example, the sequencer may perform one or more post-processing checks of each of the plurality of extensions and those checks may be performed in accordance with a sequence dictated by the extensions (and thus defined in metadata describing the validations and/or extensions). In the example of FIG. 9, the sequencer may control the execution of the checks at 940, so that the checks are performed in a particular sequence (e.g., customer check, partner check, globalization check, and core check) in accordance with the extensions. These checks may include rules verifying consistency, validating values, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible.

Figure 11:
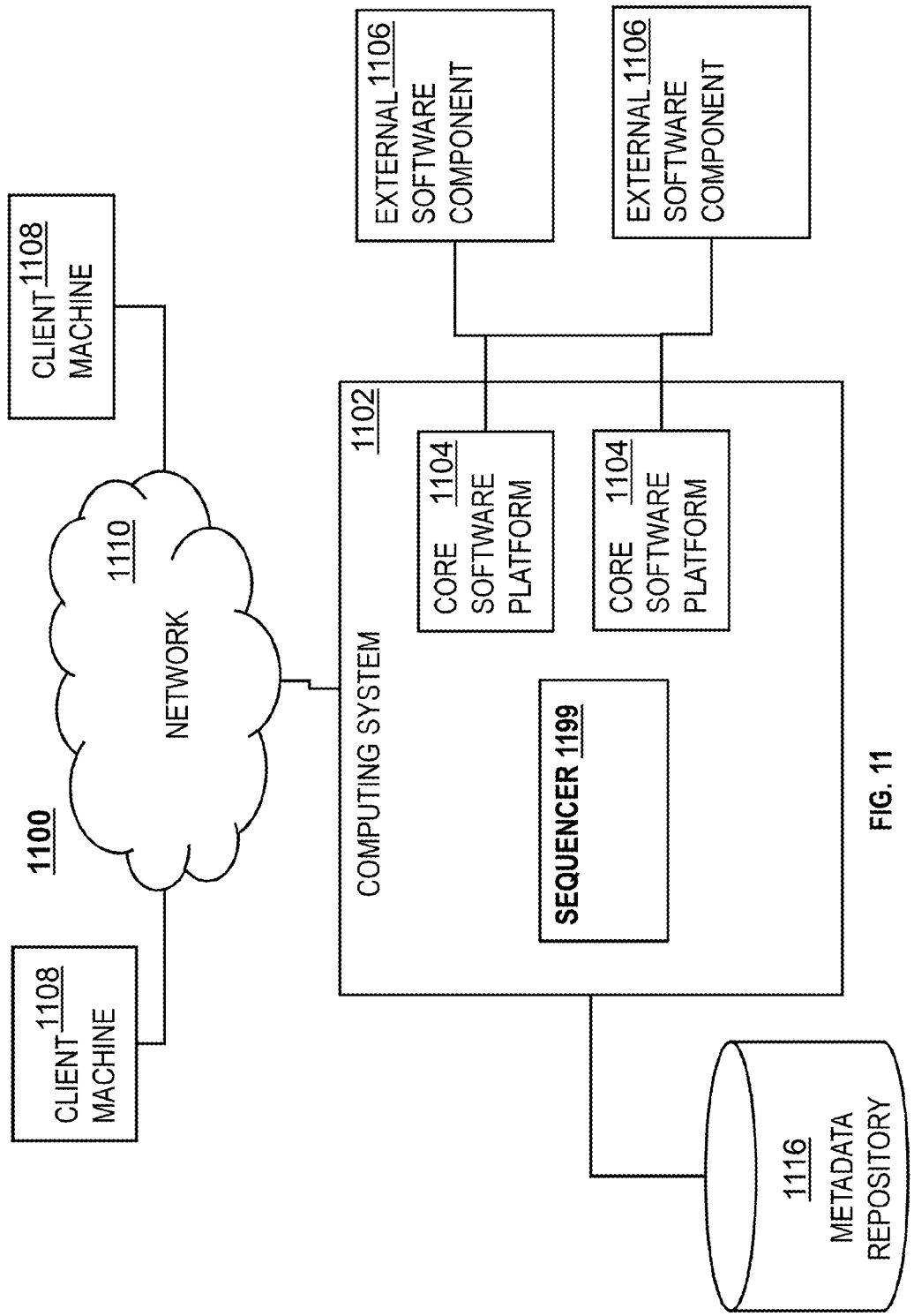
FIG. 11 shows a diagram illustrating aspects of a system showing features consistent with implementations of the current subject matter.

FIG. 11 shows a diagram of a system consistent with such an implementation. A computing system 1102 can include one or more core software platform modules 1104 providing one or more features of the ERP system (e.g., the core service extended by extensions). The computing system can also aggregate or otherwise provide a gateway via which users can access functionality provided by one or more external software components 1106, which can optionally be available from a service provider external to the core software platform modules 1104. The computing system 1102 may include a sequencer 1199 configured to monitor and control execution sequences, perform consistency checks, perform action validation checks, and other operations as disclosed herein. The sequencer 1199 may also access repository 1116, which may include metadata describing aspect of the core service and the extensions (e.g., dependencies, definitions of consistency checks, validations, and the like) and describing aspects of the business objects including extensions. Client machines 1108 can access the computing system, either via a direct connection, a local terminal, or over a network 1110 (e.g. a local area network, a wide area network, a wireless network, the Internet, or the like).

Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

In a software delivery configuration in which services of an ERP system are provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 12:
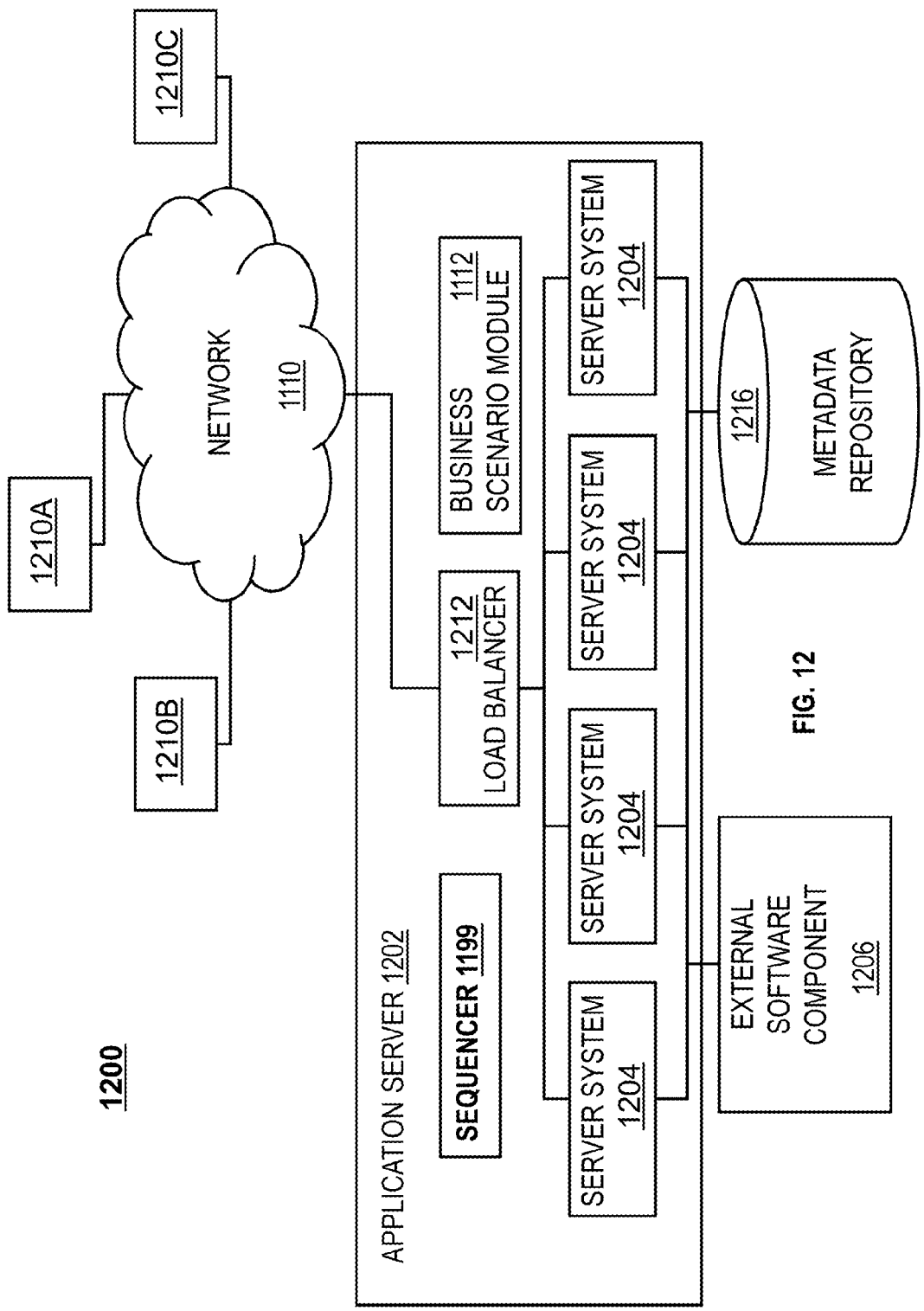
FIG. 12 shows a diagram illustrating aspects of another system showing features consistent with implementations of the current subject matter.

FIG. 12 shows a block diagram of a multi-tenant implementation of a software delivery architecture 1200 that includes an application server 1202, which can in some implementations include multiple server systems 1204 that are accessible over a network 1206 from client machines operated by users at each of multiple organizations 1210A-1210C (referred to herein as "tenants" of a multi-tenant system) supported by a single software delivery architecture 1200. The application server 1202 may include a core service extended by extensions as disclosed herein and further include the sequencer 1199, although the sequencer may be at other locations as well.

For a system in which the application server 1202 includes multiple server systems 1204, the application server can include a load balancer 1212 to distribute requests and actions from users at the one or more organizations 1210A-1210C to the one or more server systems 1204. Instances of the core software platform can be executed in a distributed manner across the server systems 1204. A user can access the software delivery architecture across the network using a thin client, such as for example a web browser or the like, or other portal software running on a client machine. The application server 1202 can access data and data objects stored in one or more data repositories 1216. The application server 1202 can also serve as a middleware component via which access is provided to one or more external software components 1206 that can be provided by third party developers.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 1202 that includes multiple server systems 1204 that handle processing loads distributed by a load balancer 1212. Potential benefits from such an arrangement can include, but are not limited to, high and reliably continuous application server availability and minimization of unplanned downtime, phased updating of the multiple server systems 1204 to permit continuous availability (one server system 1204 can be taken offline while the other systems continue to provide services via the load balancer 1212), scalability via addition or removal of a server system 1204 that is accessed via the load balancer 1212, and de-coupled lifecycle processes (such as for example system maintenance, software upgrades, etc.) that enable updating of the core software independently of tenant-specific customizations implemented by individual tenants.

The metadata repository 1216 can store business objects that represent a template definition of a standard business process. Further, each individual tenant 1210A-1210C can customize that standard template according to the individual business process features specific to business of the organization to which that tenant is assigned. Customizations can be stored as extensions in the metadata repository. The metadata repository 1216 can also include metadata access by the sequencer 1199. For example, sequencer 1199 may access repository 1216 to obtain metadata describing aspects of the core service and the extensions. This metadata (e.g., dependencies, definitions of consistency checks, validations, and the like) may be used by sequencer 1199 to perform the sequencing of the extensions disclosed herein.

Figure 13:
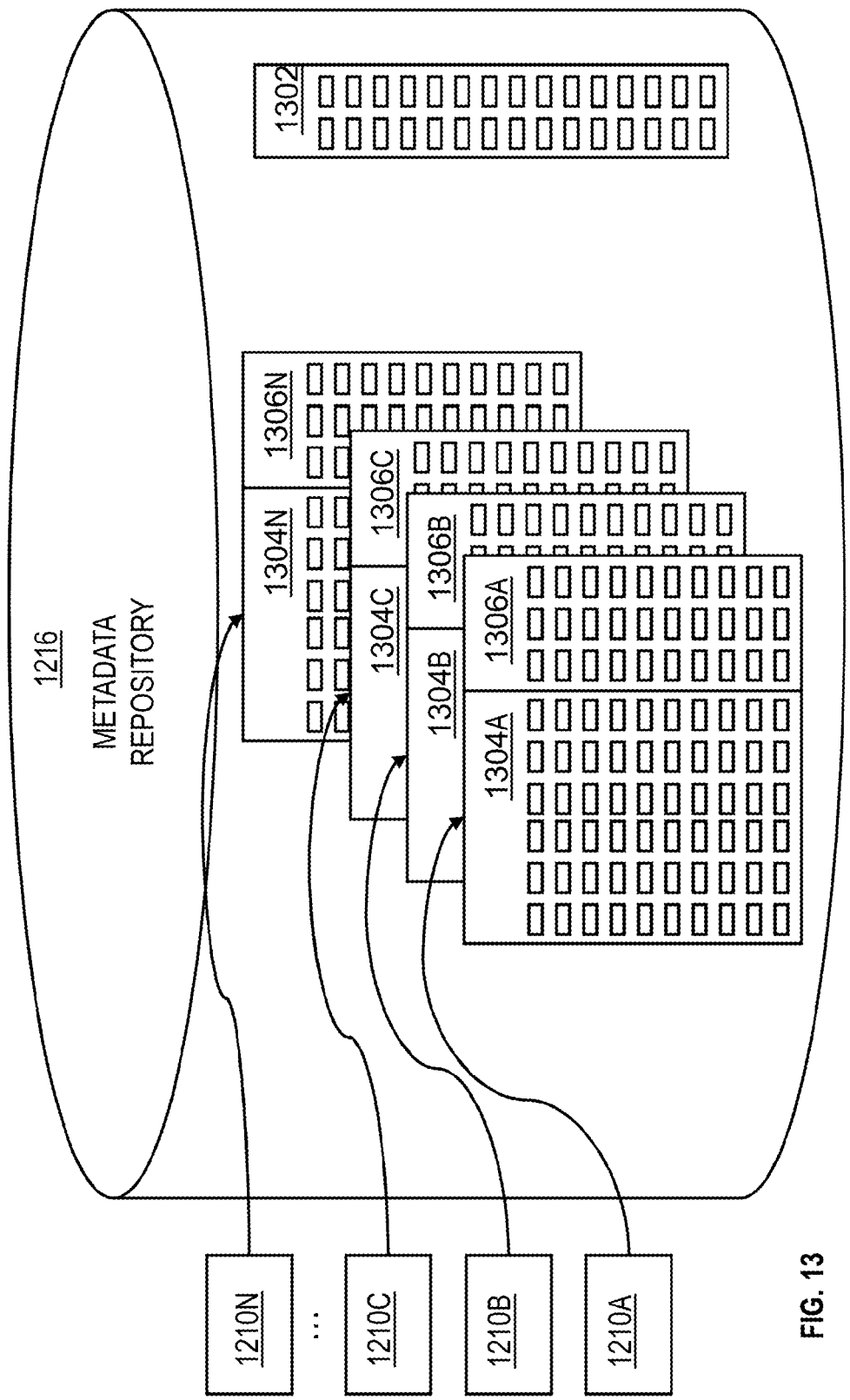
FIG. 13 is a diagram illustrating a data repository showing features consistent with implementations of the current subject matter.

To provide for customization of the business process for each of multiple organizations supported by a single software delivery architecture 1200, the data and data objects stored in the metadata repository 1216 and/or other data repositories that are accessed by the application server 1202 can include three types of content as shown in FIG. 13: core software platform content 1302 (e.g. a standard definition of a business process), system content 1304 and tenant content 1306. Core software platform content 1302 includes content that represents core functionality and is not modifiable by a tenant. System content 1304 can in some examples be created by the runtime of the core software platform and can include core data objects that store concrete data associated with specific instances of a given business process and that are modifiable with data provided by each tenant. The data retained in these data objects are tenant-specific: for example, each tenant 1210A-1210N can store information about its own inventory, sales order, etc. Tenant content 1306A-1306N includes data objects or extensions to other data objects that are customized for one specific tenant 1210A-1210N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 1306 can reflect tenant-specific modifications or changes to a standard template definition of a business process as well as tenant-specific customizations of the business objects that relate to individual process step (e.g. records in generated condition tables, access sequences, price calculation results, other tenant-specific values, or the like). A combination of the software platform content 1302 and system content 1304 and tenant content 1306 of a specific tenant are accessed to provide the business process definition and/or the status information relating to a specific instance of the business process according to customizations and business data of that tenant such that each tenant is provided access to a customized solution whose data are available only to users from that tenant.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable storage medium storing one or more programs, the one or more programs comprising instructions, when executed by at least one programmable processor, cause the at least one programmable processor to perform operations comprising:

performing, by a sequencer, one or more validations of a plurality of executable extensions to a core service of a the multi-tenant system, wherein the plurality of executable extensions represent logic extending the core service, wherein the sequencer comprises at least one processor of the multi-tenant system where a plurality of client machines access the core service at the multi-tenant system, wherein the plurality of executable extensions comprise a first extension specific to a region, a second extension specific to an industry, a third extension developed by an entity other than a developer of the core service, and a fourth extension specific to an end-user of the multi-tenant system;

accessing, by the sequencer, a repository including metadata, wherein the metadata defines a static dependency among the core service and the plurality of executable extensions and a runtime dependency among the core service and the plurality of executable extensions, wherein the sequencer is coupled to the repository of the multi-tenant system;

controlling, by the sequencer and based on at least metadata, execution of a sequence including the plurality of executable extensions and the core service to enable an action to be performed at the system, the controlling including triggering, during runtime, execution of the first extension, the second extension, the third extension, and/or the fourth extension in a stack separate from another stack including the core service; and performing, by the sequencer, one or more post-processing checks of the plurality of executable extensions by at least performing a consistency check of data associated with at least one of the plurality of executable extensions.

2. The computer-readable medium of claim 1, wherein the sequencer accesses the metadata defining at least dependencies among the first extension, the second extension, the third extension, and the fourth extension, wherein the metadata enables to execution of the performing the one or more validations, the controlling, and the performing the one or more post-processing checks.

3. The computer-readable medium of claim 2, wherein the sequencer comprises at least one processor of a multi-tenant system including the core service, the at least one processor coupled to a repository including the metadata.

4. The computer-readable medium of claim 1, wherein the one or more validations include controlling, based on the metadata, a declaration from at least one of the plurality of extensions to another one of the plurality of executable extensions.

5. The computer-readable medium of claim 1, wherein the one or more validations include controlling, based on the metadata, a dependency between at least one of the plurality of executable extensions and another one of the plurality of executable extensions.

6. The computer-readable medium of claim 1, wherein the one or more validations include controlling the sequence of a runtime execution of the plurality of executable extensions.

7. The computer-readable medium of claim 1, wherein at least one of the plurality of executable extensions includes logic to provide at least one of a determination, an action, or a validation.

8. A method comprising:

performing, by a sequencer, one or more validations of a plurality of executable extensions to a core service of a the multi-tenant system, wherein the plurality of executable extensions represent logic extending the core service, wherein the sequencer comprises at least one processor of the multi-tenant system where a plurality of client machines access the core service at the multi-tenant system, wherein the plurality of executable extensions comprise a first extension specific to a region, a second extension specific to an industry, a third extension developed by an entity other than a developer of the core service, and a fourth extension specific to an end-user of the multi-tenant system;

accessing, by the sequencer, a repository including metadata, wherein the metadata defines a static dependency among the core service and the plurality of executable extensions and a runtime dependency among the core service and the plurality of executable extensions, wherein the sequencer is coupled to the repository of the multi-tenant system;

controlling, by the sequencer and based on at least metadata, execution of a sequence including the plurality of executable extensions and the core service to enable an action to be performed at the system, the controlling including triggering, during runtime, execution of the first extension, the second extension, the third extension, and/or the fourth extension in a stack separate from another stack including the core service; and performing, by the sequencer, one or more post-processing checks of the plurality of executable extensions by at least performing a consistency check of data associated with at least one of the plurality of executable extensions.

9. The method of claim 8, wherein the sequencer accesses the metadata defining at least dependencies among the first extension, the second extension, the third extension, and the fourth extension, wherein the metadata enables execution of one or more of the performing the one or more validations, the controlling, and the performing the one or more post-processing checks.

10. The method of claim 8, wherein the sequencer comprises at least one processor of a multi-tenant system including the core service, the at least one processor coupled to a repository including the metadata.

11. The method of claim 8, wherein the one or more validations include controlling, based on the metadata, a declaration from at least one of the plurality of extensions to another one of the plurality of executable extensions.

12. A system comprising:

at least one processor; and at least one memory including code which when executed by the at least one processor causes operations comprising:

performing, by a sequencer, one or more validations of a plurality of executable extensions to a core service of a multi-tenant system, wherein the plurality of executable extensions represent logic extending the core service, wherein the sequencer comprises at least one processor of the multi-tenant system where a plurality of client machines access the core service at the multi-tenant system, wherein the plurality of executable extensions comprise a first extension specific to a region, a second extension specific to an industry, a third extension developed by an entity other than a developer of the core service, and a fourth extension specific to an end-user of the multi-tenant system;

accessing, by the sequencer, a repository including metadata, wherein the metadata defines a static dependency among the core service and the plurality of executable extensions and a runtime dependency among the core service and the plurality of executable extensions, wherein the sequencer is coupled to the repository of the multi-tenant system;

controlling, by the sequencer and based on at least accessed metadata, execution of a sequence including the plurality of executable extensions and the core service to enable an action to be performed at the system, the controlling including triggering, during runtime, execution of the first extension, the second extension, the third extension, and/or the fourth extension in a stack separate from another stack including the core service; and performing, by the sequencer, a post-processing check of the plurality of executable extensions by at least performing a consistency check of data associated with at least one of the plurality of executable extensions.

* * * * *